United States Patent
Slane

(10) Patent No.: US 6,546,021 B1
(45) Date of Patent: Apr. 8, 2003

(54) METHOD AND APPARATUS FOR USER PROGRAMMABLE PACKET TO CONNECTION TRANSLATION

(75) Inventor: Albert Alfonse Slane, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/223,056

(22) Filed: Dec. 30, 1998

(51) Int. Cl.[7] .............................. H04L 12/28; H04J 3/16
(52) U.S. Cl. ........................................ 370/465; 370/389
(58) Field of Search ................................. 370/464, 465, 370/466, 467, 474, 401, 402, 389

(56) References Cited

U.S. PATENT DOCUMENTS

| | | | | |
|---|---|---|---|---|
| 5,058,110 A | * | 10/1991 | Beach et al. ................ | 370/464 |
| 5,305,317 A | * | 4/1994 | Szczepanek ................ | 370/257 |
| 5,371,852 A | * | 12/1994 | Attanasio et al. ........... | 370/401 |
| 5,428,615 A | * | 6/1995 | Backes et al. .............. | 370/392 |
| 5,485,460 A | * | 1/1996 | Schrier et al. .............. | 370/389 |
| 5,548,731 A | * | 8/1996 | Chang et al. ................ | 703/25 |
| 5,560,038 A | * | 9/1996 | Haddock ..................... | 709/236 |
| 5,758,070 A | * | 5/1998 | Lawrence .................... | 709/220 |
| 6,185,214 B1 | * | 2/2001 | Schwartz et al. ........... | 370/389 |

* cited by examiner

Primary Examiner—Wellington Chin
Assistant Examiner—William Schultz
(74) Attorney, Agent, or Firm—Joan Pennington

(57) ABSTRACT

A method and apparatus are provided for user programmable packet to connection translation. When a data block is received, a protocol type for the received data block is identified based upon the media connection or port number for the recevied data block. A connection identification is formed utilizing a header of the received data block, responsive to the identified protocol type for the received data block. An instruction array is used with an arithmetic logic unit (ALU). Different code sequences are loaded into the instruction array based upon the user configured protocol type for a media connection of the received data block.

2 Claims, 6 Drawing Sheets

Q.922 FOUR BYTE HEADER 300

ATM HEADER 400

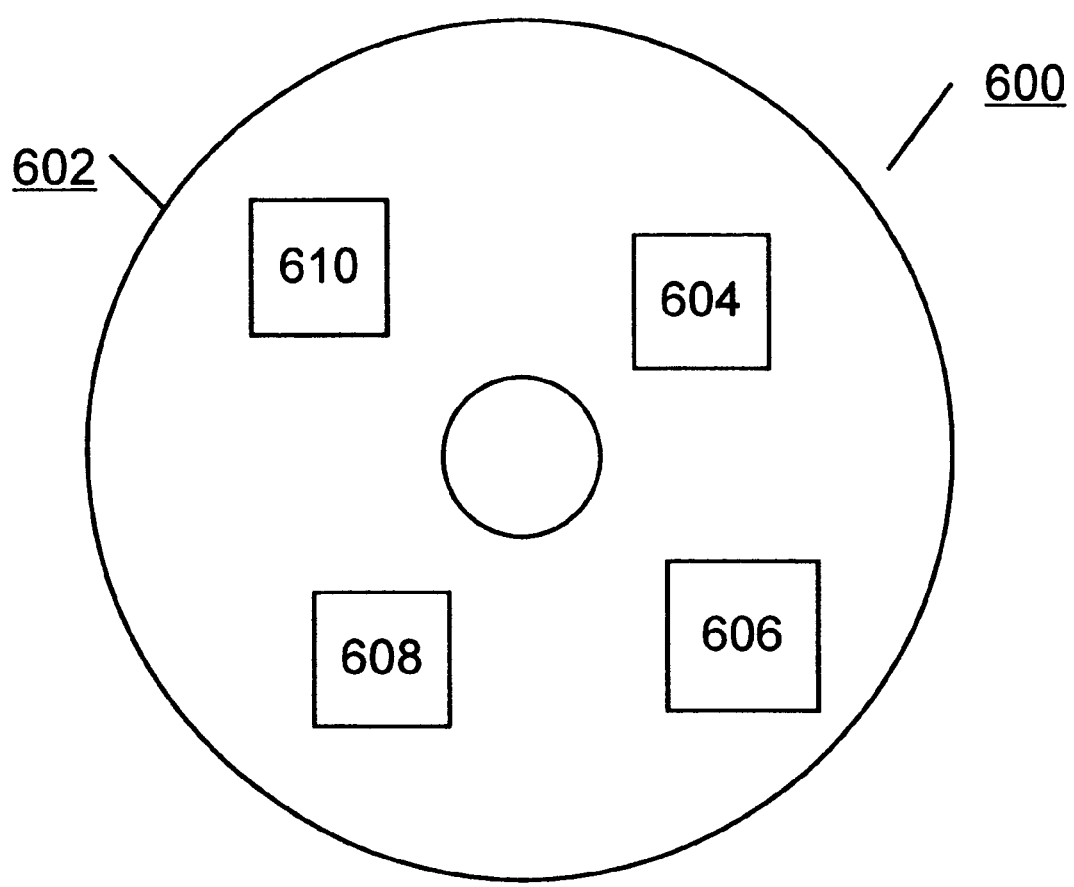

METHOD AND APPARATUS FOR USER PROGRAMMABLE PACKET TO CONNECTION TRANSLATION

FIELD OF THE INVENTION

The present invention relates generally to the data processing field, and more particularly, relates to a method and apparatus for user programmable packet to connection translation in a communications system.

DESCRIPTION OF THE RELATED ART

When cells are received in an Asynchronous Transfer Mode (ATM) network or other network, the header is examined to determine a corresponding connection for the received cell. In one known communications adapter, this process is called logical channel descriptor (LCD) translation. In the LCD translation process, predefined VPI/VCI fields are used to generate a LCD index. The LCD index corresponds to a receive connection. This is a simple hardware implemented process in that a configurable number of fixed bits are selected and then the selected bits are concatenated together to provide the LCD index.

In a new communications adapter that supports multiple external physical networks of different types, this simple packet to connection translation is not effective. The physical connections might be ATM connections or different types of packet based adapters like Ethernet, HDLC, Q922.2, FUNI2.0, and the like. The connection of translation logic has become very complex and highly configurable due to different user needs. A different more general method is needed for packet to connection translation.

SUMMARY OF THE INVENTION

A principal object of the present invention is to provide an improved method and apparatus for user programmable packet to connection translation. Other important objects of the present invention are to provide such method and apparatus for user programmable packet to connection translation for use with a variety of modes for communications and to provide such method and apparatus that overcome disadvantages of prior art arrangements.

In brief, a method and apparatus are provided for user programmable packet to connection translation. When a data block is received, a protocol type for the received data block is identified. A connection identification is formed utilizing a header of a received data cell, responsive to the identified protocol type for the received data block.

In accordance with features of the invention, an instruction array is used with an arithmetic logic unit (ALU). The protocol type for the received data block is identified based upon the media connection or port number of the received data block. Different code sequences are loaded into the instruction array based upon the identified protocol type for a media connection. The protocol type for a media connection is user programmed or configured.

BRIEF DESCRIPTION OF THE DRAWINGS

The present invention together with the above and other objects and advantages may best be understood from the following detailed description of the preferred embodiments of the invention illustrated in the drawings, wherein:

FIG. 6 is a block diagram illustrating a computer program product in accordance with the invention.

DETAILED DESCRIPTION OF THE PREFERRED EMBODIMENTS

Figure 1:
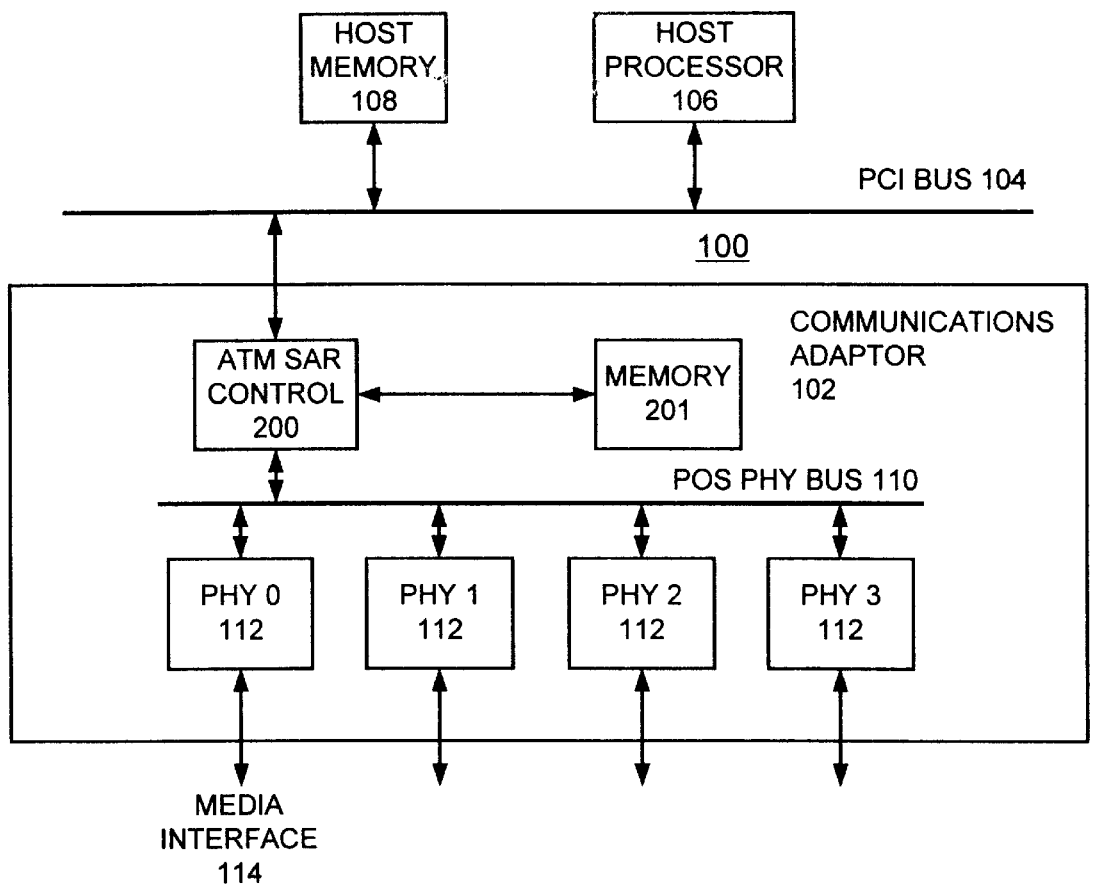
FIG. 1 is a block diagram representation illustrating a communications adapter of the preferred embodiment.

Having reference now to the drawings in FIG. 1, there is shown a communications system generally designated by 100 including a communications adapter generally designated by 102 and arranged in accordance with the preferred embodiment. As shown in FIG. 1, adapter 102 includes an ATM segmentation and reassembly control 200 of the preferred embodiment. The ATM SAR control 200 of the preferred embodiment is illustrated and described with respect to FIG. 2. A local memory 201 within the communications adapter 102 is coupled to or included within the ATM SAR control 200. As shown, the ATM SAR control 200 is connected to a peripheral component interconnect (PCI) bus 104 coupled to a host processor 106 and a host memory 108. The ATM SAR control 200 is connected by a packet over SONET (POS) physical bus 110 to a plurality of physical (PHY) layer 112. Each of the multiple physical layers 112 is connected to a respective media interface 114. Adapter 102 provides interface and translator functions between the PHY layers 112 and the peripheral component interconnect (PCI) bus 104. Adapter 102 includes a transmission logic (not shown) and a cell scheduler (not shown). Adapter 102 is illustrated in simplified form sufficient for an understanding of the present invention.

Figure 2:
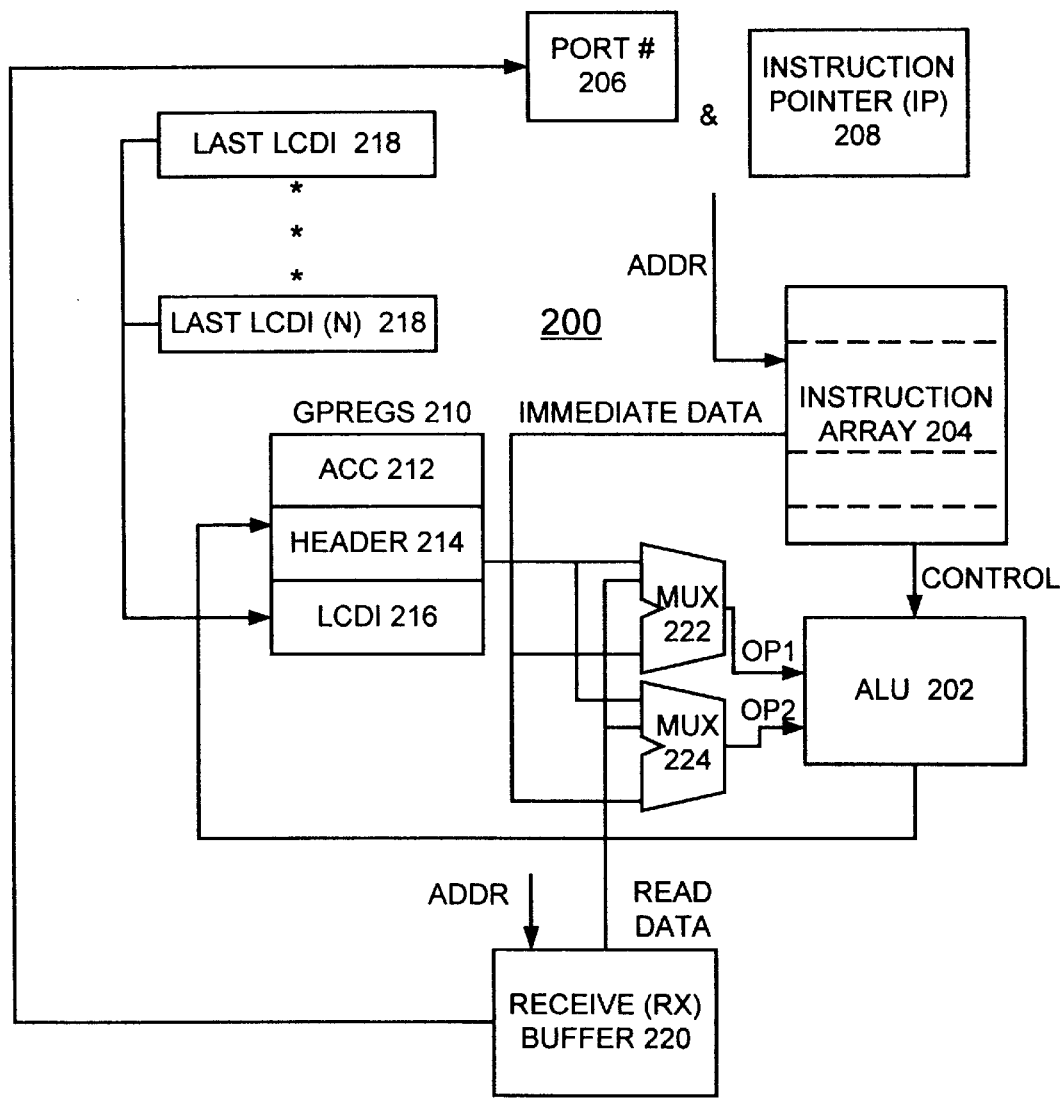
FIG. 2 is a schematic diagram representation illustrating a nano-processor structure for user programmable packet to connection translation of the preferred embodiment.

FIG. 2 illustrates the ATM SAR control 200 including a nano-coded processor architecture for user programmable packet to connection translation of the preferred embodiment. The nano-coded processor architecture 200 includes an arithmetic logic unit (ALU) 202 coupled to an instruction array 204 that provides a control input to the ALU 202. Instruction array 204 includes, for example four sections with one section for each media connection, with each section including thirty-two, 20-bit wide instructions. User loadable code is stored by instruction array 204. An address to the instruction array 204 is provided by a port register 206 identifying a particular one of multiple, different media connections 104 for receive (RX) buffer data and an instruction pointer register 208. A user configured protocol type for each media connection 104 is stored. A media connection or port number of a received data block or received data cells is stored in port register 206. An ALU result is coupled to a plurality of general purpose registers (GPREGS 210) including an ACC register 212, a header register 214, and a logical channel descriptor index (LCDI) register 216. A respective last LCDI register 218 for each 1–(N) of the multiple, different media connections or ports 112, couples the last LCDI value to the LCDI register 216. A receive (RX) buffer 220 provides read data to a pair of multiplexers 222 and 224 that also are coupled to the GPREGS 210 for receiving accumulator, header, LCDI and last LCDI values. Immediate data is coupled between the instruction array 204 and each of the multiplexers 222 and 224. Multiplexers 222 and 224 respectively provide operand inputs OP1, OP2 to the ALU 202.

In accordance with features of the preferred embodiment, the small nano-processor ALU 202 executes simple RISC-like instructions. As cells arrive at the receive buffer 220, a nano-program is run based on a particular port for the received cell identified from the port register input 206. For example, the communications adapter 102 supports Asynchronous Transfer Mode (ATM), Gigabit Ethernet or IEEE 802.3u standard, point to point protocol (PPP), FUNI 2.0, Q922.2, and several vendor specific formats. A particular one of the different code loads is loaded into the instruction array 204 based on a protocol type of physical that is configured for the corresponding connection. Other formats, such as Token Ring can be added without any hardware changes. The nano-program in turn examines the data in the receive cell buffer to determine a particular connection for this cell/packet. For the packet based physical connection, there is some additional state involved because the connection is only calculated for the first cell of a given packet. The same connection stored in the last LCDI 218 then is used for that packet based physical drop until the packet is complete. For ATM or cell based interfaces, the connection is calculated for each cell that is received.

Figure 3:
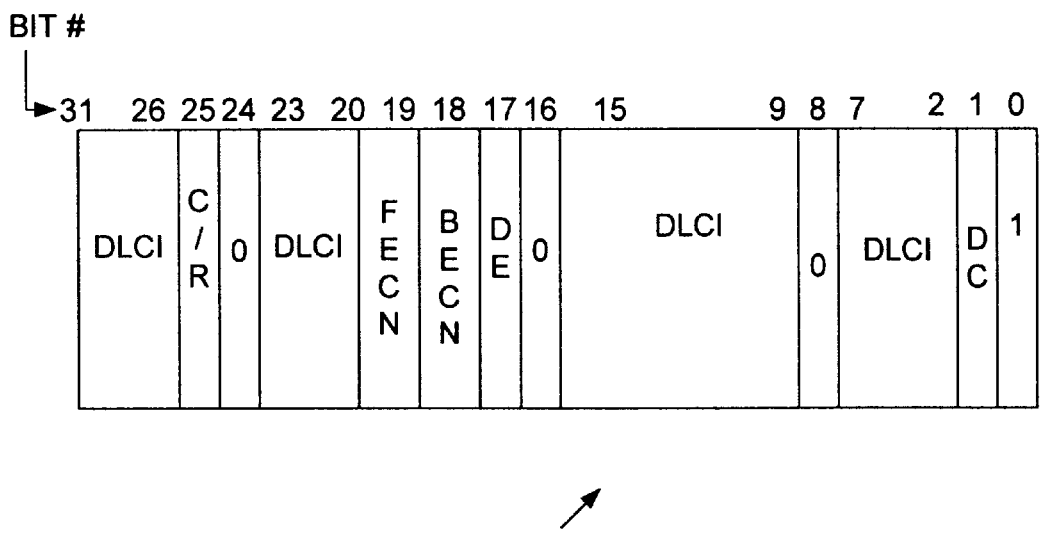
FIG. 3 illustrates a Q.922 header structure used with the nano-processor structure for user programmable packet to connection translation of the preferred embodiment of FIG. 2.

Referring to FIG. 3, there is shown a Q.922 header structure designated by the reference character 300 used with the nano-processor structure 200 for user programmable packet to connection translation. The Q.922 header structure 300 includes 4 bytes or 32 bits 0:31 with predefined fields defined as 1, DC, DLCL, 0, DE, BECN, FECN, and C/R, as shown.

Figure 4:
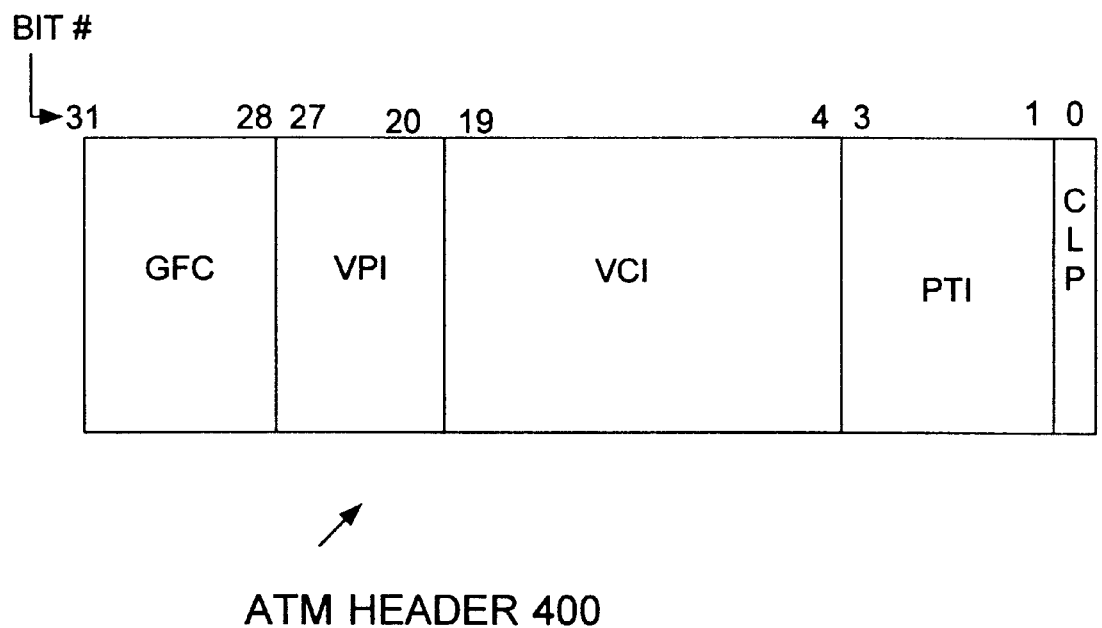
FIG. 4 illustrates an ATM header structure used with the nano-processor structure for user programmable packet to connection translation of the preferred embodiment of FIG. 2.

Referring to FIG. 4, there is shown an ATM header structure designated by the reference character 400 used with the nano-processor structure 200 for user programmable packet to connection translation. ATM header structure 400 includes 4 bytes or 32 bits 0:31 with predefined fields defined as CLP, VCI, CPI, and GFC, as shown.

Figure 5:
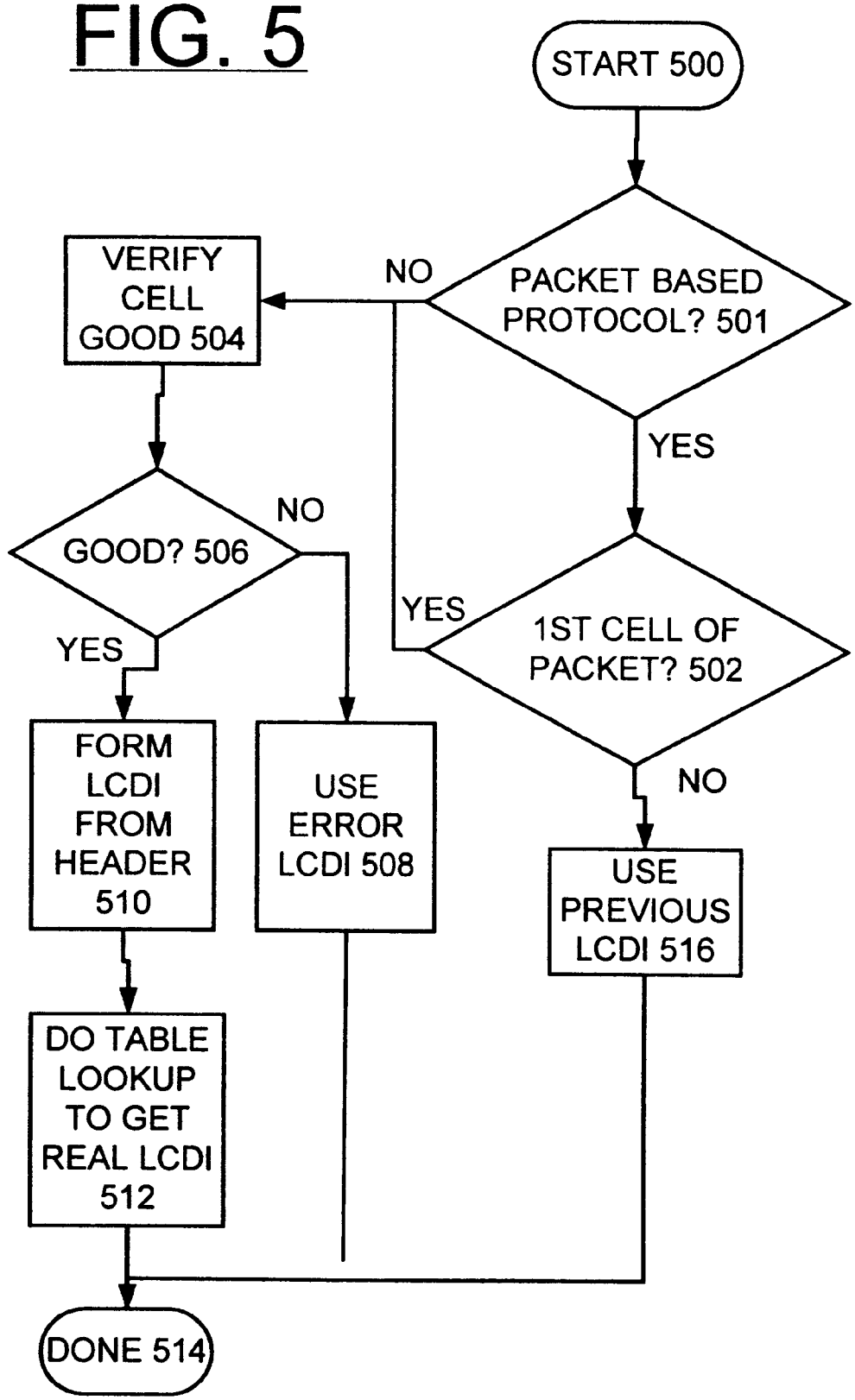
FIG. 5 is a flow chart illustrating exemplary sequential steps performed by the nano-processor structure for user programmable packet to connection translation of the preferred embodiment of FIG. 2.

Referring now to FIG. 5, there are shown exemplary sequential steps performed by the nano-processor structure 200 for user programmable packet to connection translation of the preferred embodiment starting at a block 500. The basic steps in the nano-program are header verification, connection calculation, and statistics update. Checking for a packet based protocol is performed as indicated at decision block 501. If packet based protocol is identified at decision block 500, then checking if this is the first cell of the packet is performed as indicated at decision block 502. When determined that this is the first cell of the packet at decision block 502 and when packet based protocol is not identified at decision block 500, then the cell is verified to be good as indicated at block 504. If a good cell is not identified as indicated at decision block 506, an error LCDI is used as indicated at block 508. Otherwise if a good cell is identified at decision block 506, then a LCDI is formed from the cell header as indicated at block 510. Then a table lookup is performed to get the real LCDI as indicated at block 512. This completes the packet to connection translation as indicated at block 514. Otherwise when determined that this is not the first cell of the packet at decision block 502, then the previous or last LCDI stored at the respective last LCDI 218 is used as indicated at block 516 which completes the packet to connection translation.

The following TABLE 1 provides a pseudo code example of Q.922 translation code in the instruction array 204 for the Q.922 header structure 300 of FIG. 3.

TABLE 1

```
head = read 4 bytes from rxbuf at offset 0
if  (bit(0) == 1) && (bit(8) ==0) &&
    (bit(16) == 1) && (bit(8) ==0)   {
    if dcBit == 1 {
        lcdAddr = defaultPortLcd
    }
    else {
        tblIndex =(head and dlciMask1) >> dlciShift1
        tblIndex |=((head and dlciMask2) >> dlciShift2)
        tblIndex |=((head and dlciMask3) >> dlciShift3)
        lcdIndex = Lookup(lcdTable, tblIndex)
        lcdAddr = lcdBase + lcdIndex*128
    }
}
else {
    lcdAddr = errorLcdAddr
}
```

As shown above in the pseudo code of TABLE 1, first the header network bytes 0–3 are read. EA bits indicate four byte address. Checking that byte 0, bit 1, byte 1, bit 1 and byte 2 bit 1 are set to zero (0) and byte 3, bit 1 is set for to one (1) in the Q.922 header structure 300, as shown in FIG. 3. Then the DC bit is checked as being set and if set then surface on default port LCD. Otherwise, then the 16 least significant DLCI bits are gathered, 3 DLCI bits are gathered from byte 1, 7 DLCI bits are gathered from byte 2, and 6 DLCI bits are gathered from byte 3 to define a table Index. Then the index from control memory is read using the table Index and an LCD address is calculated from the index. Otherwise, an error is set if a four byte address is not read.

The following TABLE 2 provides a pseudo code example of ATM translation code in the instruction array 204 for the ATM header structure 400 of FIG. 4.

TABLE 2

```
atmH = read 4 bytes from rxbuf at offset 0
if non_user_data  {
    lcdAddr = defaultLcd
    return
}
tblIndex = (atmH and vciMask) >> 4
tblIndex |= ( (atmH and vpiMask) >> VpiShift)
if non-masked bits on {
    out of range counter ++
    if (mode == flush)
        flush cell
    }
    else {
        lcdAddr = errorLcdAddr
    }
    return
}
if tblIndex == 0 {
    zero id counter ++
    if (mode == flush)
        flush cell
    }
    else {
        lcdAddr = errorLcdAddr
    }
    return
}
lcdIndex = Lookup (lcdTable, tblIndex)
lcdAddr = lcdBase + lcdIndex*128
```

As shown above in the pseudo code of TABLE 2, first the ATM header bytes 0–3 are read from the cell. Non-user data is specified in PTI of the ATM header 400 as shown in FIG. 4 and the field is handled by the default logical connection descriptor (LCD). Otherwise the pertinent VCI bits and the pertinent VPI bits are gathered to define a table Index that depends on the number of VCI bits used. Then checking for out of range is performed and the out of range counter is updated. If configured to flush out of range cells, then the cell flush is performed and this completes the sequence. Otherwise, an error LCD address is set. Otherwise checking for a zero id for the table Index is performed and if so, then the zero id counter is updated. If configured to flush zero id cells, then the cell flush is performed and this completes the sequence. Otherwise, the index is read from control memory using the table Index. Then the LCD address is calculated from the index.

While some of the connection translations could be committed to hardware, the method of the preferred embodiment is much more flexible and allows communications adapter 102 to be used in a wide variety of applications without changes. The method of the preferred embodiment provides significant advantages including ease of use and understanding for the user. Also it is easy to customize the translation for different users and to extend to new hardware types.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the packet to connection translation methods of the preferred embodiment.

A sequence of program instructions or a logical assembly of one or more interrelated modules defined by the recorded program means 604, 606, 608, 610, direct adapter 102 for carrying out the packet to connection translation functions of the preferred embodiment.

While the present invention has been described with reference to the details of the embodiments of the invention shown in the drawing, these details are not intended to limit the scope of the invention as claimed in the appended claims.

What is claimed is:

1. The apparatus for user programmable packet to connection translation comprising:

a nano-coded processor architecture including an arithmetic logic unit (ALU) coupled to an instruction array; said instruction array storing a plurality of user programmable code sequences, each said user programmable code sequence for a respective protocol type;

a receive buffer for receiving a data block;

a port register for storing a media connection of said received data block for identifying said protocol type for said received data block;

an instruction pointer register responsive to said identified protocol type, for providing an address to said instruction array for loading one of said user programmable code sequences, said ALU running a nano-program responsive to said loaded user programmable code sequence, examining said received data block, and forming a connection identification utilizing a header of a received data block; and a plurality of general purpose registers coupled to said ALU; said general purpose registers for receiving accumulator, header, and logical channel descriptor index values; a pair of multiplexers coupled to said general purpose registers for receiving accumulator, header, and logical channel descriptor index values; and said receive buffer providing read data coupled to said pair of multiplexers; immediate data coupled between said instruction array and said pair of multiplexers; and said pair of multiplexers providing oper- and inputs to said ALU.

2. The apparatus for user programmable packet to connection translation as recited in claim 1 wherein said ALU running a nano-program responsive to said loaded user programmable code sequence, examining said received data block for verifying a cell header by comparing predefined header bits with predefined set values; and responsive to said compared values not matching, using an error connection to surface the error.

* * * * *